United States Patent
Perry et al.

(10) Patent No.: US 8,771,885 B2
(45) Date of Patent: Jul. 8, 2014

(54) CIRCULATION OF BIPHASE FUEL CELL COOLANT

(71) Applicant: Ballard Power Systems Inc., Burnaby (CA)

(72) Inventors: Michael L. Perry, South Glastonbury, CT (US); Robert M. Darling, South Windsor, CT (US)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 13/869,384

(22) Filed: Apr. 24, 2013

(65) Prior Publication Data

US 2013/0230786 A1   Sep. 5, 2013

Related U.S. Application Data

(62) Division of application No. 12/087,088, filed on Jun. 25, 2008, now Pat. No. 8,470,480.

(51) Int. Cl.
*H01M 8/06* (2006.01)

(52) U.S. Cl.
USPC ............................................ 429/414

(58) Field of Classification Search
USPC ............................................ 429/414
See application file for complete search history.

(56) References Cited

U.S. PATENT DOCUMENTS

| | | | |
|---|---|---|---|
| 3,801,372 A * | 4/1974 | Shaw | 429/431 |
| 6,365,291 B1 * | 4/2002 | Margiott | 429/414 |
| 7,504,170 B2 * | 3/2009 | Reiser et al. | 429/429 |
| 2003/0232228 A1 * | 12/2003 | Grasso | 429/26 |
| 2004/0106034 A1 * | 6/2004 | Bekkedahl et al. | 429/44 |
| 2004/0170878 A1 | 9/2004 | Goebel | |
| 2006/0141330 A1 * | 6/2006 | Reiser et al. | 429/38 |
| 2008/0124591 A1 * | 5/2008 | Darling et al. | 429/13 |

* cited by examiner

*Primary Examiner* — Patrick Ryan
*Assistant Examiner* — Lucas J O Donnell
(74) *Attorney, Agent, or Firm* — Seed IP Law Group PLLC

(57) ABSTRACT

Coolant velocity greater than zero everywhere within the coolant channels (78, 85) of fuel cells (38) in a fuel cell stack (37) is assured by providing a flow of biphase fluid in the coolant channels, the flow being created by the outflow of a condenser (59). Positive pressure is applied to the coolant inlet (66) of the coolant channels. Biphase flow from an oxidant exhaust condenser, which may be a vehicle radiator (120), renders the coolant return flow more freeze tolerant. Using biphase flow within the coolant channels eliminates the need for a bubble-clearing liquid pump and reduces liquid inventory and other plumbing; this makes the fuel cell power plant more freeze tolerant.

4 Claims, 2 Drawing Sheets

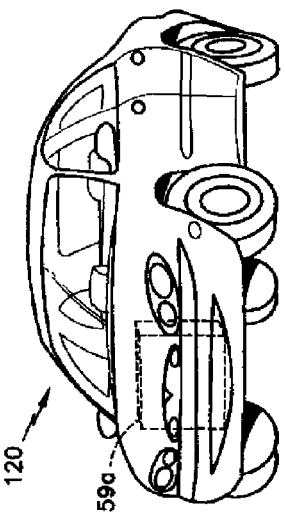
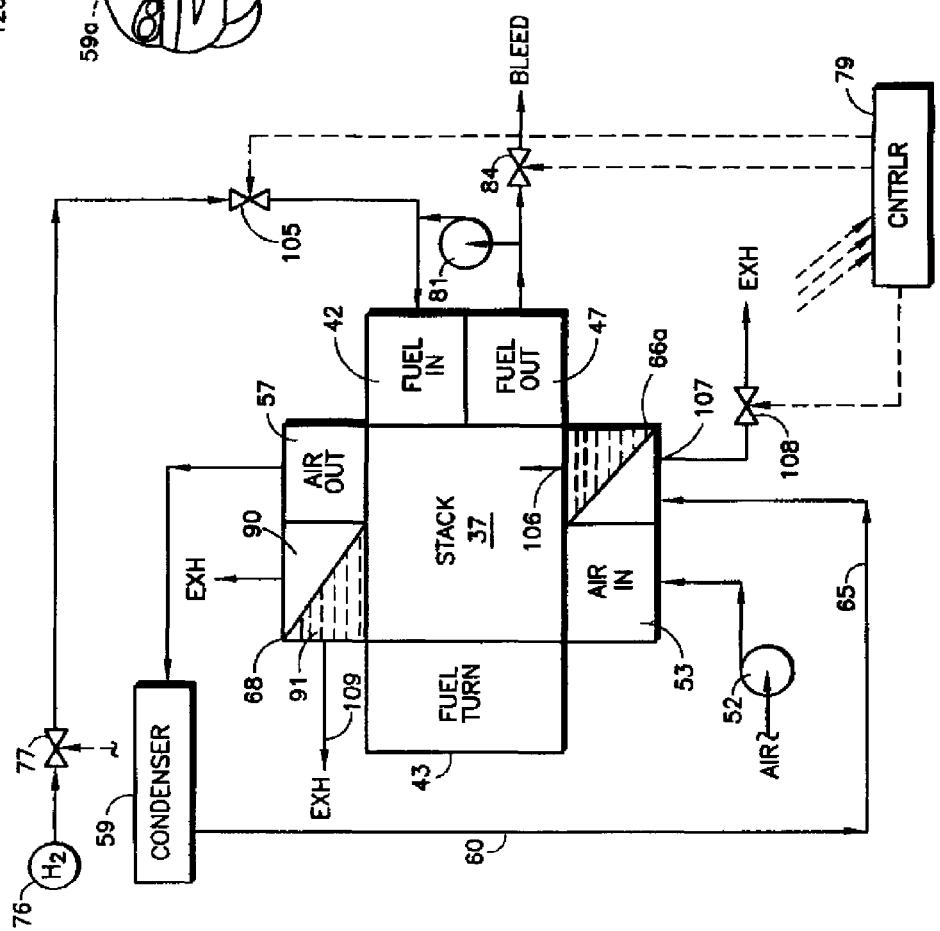

US 8,771,885 B2

CIRCULATION OF BIPHASE FUEL CELL COOLANT

CROSS REFERENCE TO RELATED APPLICATION

This application is a division of U.S. application Ser. No. 12/087,088 filed Jun. 25, 2008.

TECHNICAL FIELD

This invention relates to reducing gas bubble blockage in small, low flow coolant or water management passageways in fuel cells, by flowing sufficient gas, such as air or depleted reactant exhaust, to ensure a liquid velocity greater than zero everywhere in the coolant channels.

BACKGROUND

In order to reduce the exposure of proton exchange membrane (PEM) fuel cells to problems resulting from freezing temperatures, and to reduce reliance on water pumps and other plumbing as accessories to the fuel cells, the total volume of coolant in the fuel cells may be reduced.

However, in systems which do not use either a coolant pump or a gas venting micropump, and have minimal external water plumbing, the flow rate of coolant or water in the cells is quite low. If only gas is vented from the coolant or water passageways, the flow is limited by the amount of water which evaporates into the reactant gases. With small passageways and low water flow, gas bubbles may join together (aggregate) and block water flow from large areas of the coolant channels which may cause porous, hydrophilic reactant gas flow field plates (water transport plates) to dehydrate. The dehydration allows gas to enter the coolant flow channels at too high a rate, sometimes referred to as "gas breakthrough" of the water transport plates, thereby causing localized heating and dehydration of the membrane at various spots, resulting in degradation of components and reduced performance.

Systems employing between-cell coolant plates, which have glycol or other coolants, are sometimes referred to as active water management (AWM) fuel cells, as disclosed in U.S. Pat. No. 7,179,557. AWM fuel cells may also have extremely small, in-cell water passageways to provide low flows of water to the anode side and/or cathode side of the fuel cells for water management, with insignificant cooling resulting from the water flow.

SUMMARY

Aspects of the invention include: assuring coolant flow in small fuel cell coolant or water management passageways; mitigating bubble blockage in low-flow fuel cell coolant or water management passageways; assisting gas bubbles to flow through coolant or water management passageways in PEM fuel cells; improved venting of gas in PEM fuel cell coolant or water management passageways; reducing excessive ingestion of gas into fuel cell coolant or water management passageways; increasing gas flow toward a vent in PEM fuel cells; improved hydration in PEM fuel cells; improved evaporative cooling in PEM fuel cells; and reducing the number of components in the fuel cell power plant which have rotating parts.

As used herein, the term "fuel cell" may mean the apparatus for a complete, operative fuel cell capable of producing electricity from oxidant and fuel reactant gases, or where the context so requires, that term may mean the portion of a fuel cell exclusive of layers that provide coolant and/or water management to the fuel cells, which may be disposed between adjacent ones of said fuel cell portions.

As used herein, the term "coolant passageways" includes water management passageways and refers to those portions of the coolant and/or water management flow paths in fuel cell stacks which are substantially coextensive with the planform (the in-plane outline) of the fuel cells.

According to the present invention, gas applied to fuel cell coolant or water management passageways assures a non-zero velocity of flow through the passageways.

According to the invention, pressure drop across coolant/water passageways of fuel cells promotes flow of fluid, including coolant/water and gas bubbles within such passageways.

The water recovered from a gas/liquid separator may be recirculated into the stack, such as by being fed from the output of a condenser in a fuel cell utilizing evaporative cooling.

According further to the invention, the cathode air exhaust is applied through a condenser to an inlet of the coolant/water passageways which comprises a gas/liquid separator, thereby providing a freeze-tolerant biphase mixture of liquid and gas to the coolant inlets. The exhaust of gas from a gas outlet of the separator is controllable so as to provide a range of gas flowing through the passageways which extends from miniscule to a significant, bubble-clearing flow rate. This form of the invention eliminates an accumulator or reservoir for the condensate, allowing two-phase fluid flow from the condenser to the coolant/water passageway inlet, thereby rendering the return flow from the condenser to the fuel cell stack significantly more resistant to freezing. In this form, the condenser may comprise the radiator of a vehicle being powered by the stack of fuel cells employing the invention.

The invention eliminates pumps and reduces liquid inventory by an order of magnitude or more, thus rendering fuel cells more robust and more freeze tolerant.

Other aspects, features and advantages of the present invention will become more apparent in the light of the following detailed description of exemplary embodiments thereof, as illustrated in the accompanying drawing.

BRIEF DESCRIPTION OF THE DRAWINGS

FIG. 3 is a simplified, stylized block diagram of an evaporatively cooled fuel cell system which applies freeze-tolerant biphase condensate from a cathode exhaust condenser directly to the inlet of the coolant channels.

FIG. 4 is a simplified sketch of a vehicle powered by a fuel cell employing the invention, utilizing its radiator as a condenser for cathode exhaust.

MODE(S) OF IMPLEMENTATION

Figure 1:
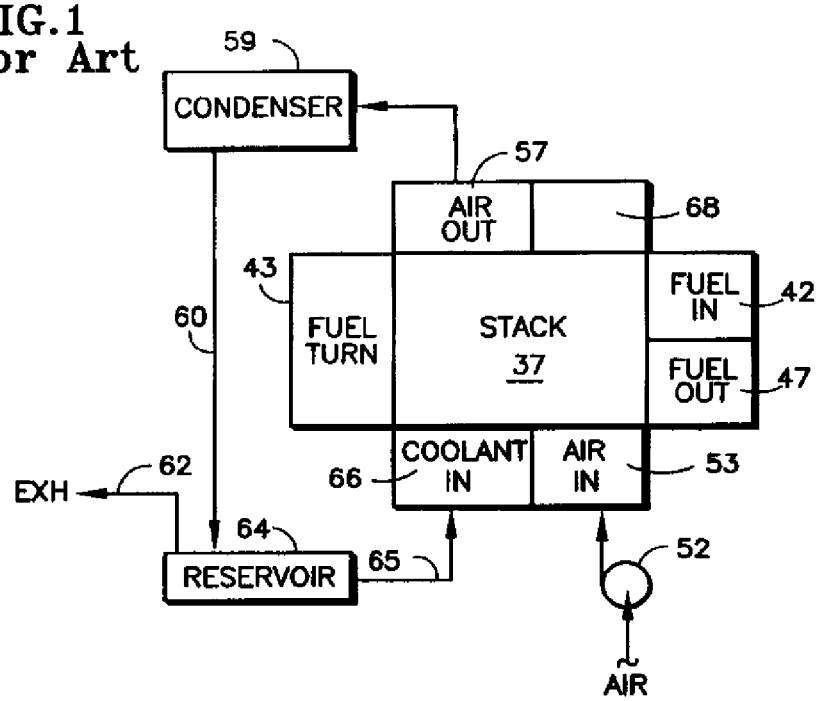
FIG. 1 is a simplified, stylized block diagram of an evaporatively cooled fuel cell system which may be modified to employ the present invention.

A fuel cell system employing evaporative cooling is disclosed in U.S. Pat. No. 7,579,098, and described with respect to FIGS. 1 and 2 herein. In the aforementioned application, a fuel cell stack 37 receives fuel from an inlet 42; the fuel passes to the left in a first half of the fuel flow field and then is returned by a fuel turn manifold 43 to pass to the right through the other half of the stack and through a fuel outlet 47. Air is pumped through an air inlet 53 by an air pump 52 into the oxidant reactant gas (air) flow fields in the stack 37; water evaporates into the air, thereby cooling the fuel cells 38 (FIG. 2). The outflow 57 of the oxidant reactant gas channels passes through a condenser 59 wherein heat is removed and the water is recovered and returned over a conduit 60 to a water/gas separator which also serves as a reservoir 64. Any gas in the water is removed through exhaust 62. The water returns over a conduit 65, through coolant inlets 66 into the coolant passageways in the stack 37. Coolant, such as water, flows from the water inlet 66 through coolant passageways 78, 85 (FIG. 2) in the stack 37 and upward toward an outlet 68.

In FIG. 2, fuel cells 38 each comprise a conventional membrane electrode assembly 72, which includes an electrolyte with anode and cathode catalysts on opposite sides thereof and may include a gas diffusion layer on one or both electrodes. Fuel reactant gas flows through channels 74 in a fuel reactant gas flow field plate 75 having grooves 76, which together with grooves 77 of an adjacent fuel cell, form minute water passageways 78 at a juncture 79a of the fuel cells 38. On the cathode side, an oxidant reactant gas flow field plate 81 includes air flow channels 82 and grooves 83 which, with grooves 84 on an adjacent fuel cell, together form minute water passageways 85 at a juncture 86 of the fuel cells.

To prevent flooding, pressure of water in the passageways is between one and ten Kilopascals lower than the pressure of the reactant gases, such as provided by an air pump and pressure-regulated fuel.

The passageways may be formed other than by matching grooves as shown, such as by channels 76, 83 or 77, 84 provided in only one of the reactant gas flow field plates 75, 81.

The reactant gas flow field plates 75, 81 appear to be the same as water transport plates, sometimes referred to as fine pore plates, in a fuel cell power plant which utilizes significant water flow through the water transport plates, with external water processing, as is disclosed in U.S. Pat. No. 5,700,595. However, because there is about a forty-times improvement in cooling effectiveness per volume of water when evaporative cooling is used, the water flow channels of the aforesaid '595 patent have cross sections which are several tens of times larger than the cross sections of the water passageways 78, 85 in FIG. 2.

In another embodiment of the aforementioned patent, there is a layer of material which is conductive, hydrophilic and has a high permeability to water, extending over substantially the entire planform of the reactant gas flow field plates 75, 81 in place of grooves forming passageways 78, 85. Such material may be carbon fiber paper, with fibers aligned in the direction of water motion to help with in-plane water permeability, or it may be other material conventionally used as fuel cell diffusion media.

The water passageways are typically very small and capable of providing the water required for evaporative cooling. Also, water flow in addition to that needed for evaporative cooling can assist in removing gas bubbles which leak in from the reactant gas channels. This water flow may assist in deionizing (demineralizing) water which is circulating in the system. Such water flow can be adequate only if provided by a pump and plumbing external to the fuel cells, with a significant inventory of water, which is a disadvantage in freezing climates.

Figure 2:
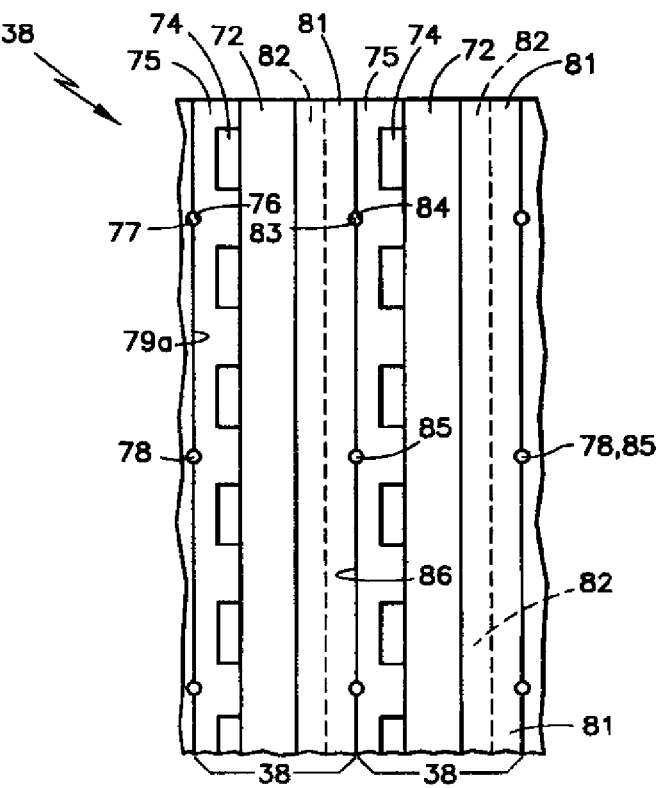
FIG. 2 is a partial, sectioned side elevation view of a pair of fuel cells employing minute water passageways, with the sectioning lines omitted for clarity.

Referring to FIG. 3, an embodiment of the invention is shown in a fuel cell power plant substantially as described with respect to FIG. 1 hereinbefore, but with additional details and elements. In FIG. 3, there is a source 76 of hydrogen-containing gas which passes through a valve 77 to the fuel inlet 42. The valve 77 is adjusted by a controller 79. The fuel outlet 47 is fed to a fuel recycle pump 81 which returns fuel exhaust to the fuel inlet 42, as is conventional. The fuel outlet is also connected to a bleed valve 84 adjusted by the controller 79 to release some of the exhausted fuel either periodically or at a slow bleed rate, thereby to eliminate some of the impurities, particularly nitrogen, which build up in the recycled fuel. The exhausted fuel passing through the bleed valve 84 may be reacted in a catalytic converter or fed into the oxidant reactant stream as disclosed in U.S. Pat. No. 6,124,054.

The controller may also control a valve between the air pump 52 and the air inlet 53.

The coolant outlet, which in this embodiment is the water outlet 68, is a gas/liquid separator, such as a hydrophobic porous plug, in which gas is allowed to escape from a gas vent 90 and coolant (such as water) is allowed to pass through a liquid outlet 91 to exhaust.

In the embodiment of FIG. 3, the reservoir 64 (FIG. 1) is not used, and the condensate from the condenser 59 and the remaining cathode exhaust air are both fed in a biphase mix through the conduits 60, 65 to a gas/liquid separator 66a which comprises the coolant inlet in this embodiment. The water outlet 106 is applied to the coolant channels, and a gas outlet 107 is connected through a controlled valve 108 to exhaust. By controlling the back pressure of the gas outlet, a certain amount of gas will pass through the coolant channels with the liquid from nil to a bubble sweeping flow.

The embodiment of FIG. 3 can be extremely useful in a power plant employing the fuel cell stack 37 of this embodiment in a fuel cell powered electric vehicle 120 (FIG. 4). In such a case, the condenser 59 is a conventional vehicle radiator 59a, the reservoir 64 typically being combined with the radiator at the base thereof. In addition to providing bubble-removing flow through the coolant channels, if desired, this embodiment has the additional advantage of carrying the condensate and the cathode exhaust air as a biphase fluid through the conduits 60, 65. This will depress the freeze temperature of the water portion of the biphase fluid. By omitting a reservoir, this also minimizes the volume of liquid water external to the stack where the risk of freezing is greater because of not being in thermal communication with the waste heat of the stack. The use of this embodiment minimizes the risk of freezing in the return conduits 60, 65.

The water gas separator 66a may be combined with the coolant inlet manifold, or may be adjacent to the coolant inlet manifold. In various embodiments, the valve 108 may be controlled so that there is no gas, or some gas, or all the gas that is present, exiting the separator 66a through the water outlet 106.

This invention may be used in an evaporatively cooled fuel cell employing an antifreeze mixture, as disclosed in WO 2007/064338.

The invention claimed is:
1. A fuel cell power plant comprising:
a stack (37) of fuel cells (38), each fuel cell having coolant passageways (78, 85) connected between a coolant inlet (66) and a coolant outlet (68), a fuel reactant gas flow field plate (75) connected between a fuel inlet (42) and a fuel outlet (47), an oxidant reactant gas flow field plate (81) connected between an air inlet (53) and an air outlet (57), at least one of said plates being porous and hydrophilic, and a membrane electrode assembly, including anode and cathode catalysts, disposed between said flow field plates; and
a controller (79;

characterized by:

a condenser (59);

said coolant inlet (66*a*) includes a gas/liquid separator (107/108) having a gas exhaust outlet controlled by said controller; and fluid communication between said air outlet (57), through said condenser, to said coolant inlet (66*a*).

2. A fuel cell power plant according to claim 1 further characterized by:

said condenser (59) is a radiator (59*a*) of a fuel cell-powered vehicle (120).

3. A fuel cell power plant characterized by:

a stack (37) of fuel cells (38), each fuel cell having coolant passageways (78, 85) connected between a coolant inlet (66) and a coolant outlet (68), a fuel reactant gas flow field late 75 connected between a fuel inlet 42 and a fuel outlet 47 an oxidant reactant gas flow field late 81 connected between an air inlet 53 and an air outlet (57), at least one of said plates being porous and hydrophilic, and a membrane electrode assembly, including anode and cathode catalysts, disposed between said flow field plates; and a controller (79);

characterized by:

said coolant inlet (66*a*) includes a gas/liquid separator (107/108) having a gas exhaust outlet controlled by said controller; and a condenser (59) between said air outlet and said coolant inlet; and fluid communication of two-phase gas/liquid flow from said condenser to said coolant inlet.

4. A fuel cell power plant according to claim 3 further characterized by:

said condenser (59) is a radiator (59*a*) of a fuel cell-powered vehicle (120).

* * * * *

UNITED STATES PATENT AND TRADEMARK OFFICE
CERTIFICATE OF CORRECTION

PATENT NO. : 8,771,885 B2
APPLICATION NO. : 13/869384
DATED : July 8, 2014
INVENTOR(S) : Michael L. Perry et al.

It is certified that error appears in the above-identified patent and that said Letters Patent is hereby corrected as shown below:

In the claims

Column 4, Line 67:
"a controller (79;" should read, --a controller (79);--.

Column 5, Lines 16-18:
"field late 75 connected between a fuel inlet 42 and a fuel outlet 47, and oxidant reactant gas flow field late 81 connected between an air inlet 53 and an air outlet (57), at" should read, --field plate (75) connected between a fuel inlet (42) and a fuel outlet (47), and oxidant reactant gas flow field plate (81) connected between an air inlet (53) and an air outlet (57), at--.

Signed and Sealed this
Thirty-first Day of May, 2016

Michelle K. Lee
*Director of the United States Patent and Trademark Office*